(12) United States Patent
Degen et al.

(10) Patent No.: US 8,888,943 B1
(45) Date of Patent: Nov. 18, 2014

(54) PROCESS FOR PRODUCING METAL FOIL LABELS IN ROLL FORM

(75) Inventors: Paul A. Degen, Mason City, IA (US); James A. Miller, Mason City, IA (US)

(73) Assignee: Metalcraft, Inc., Mason City, HI (US)

( * ) Notice: Subject to any disclaimer, the term of this patent is extended or adjusted under 35 U.S.C. 154(b) by 387 days.

(21) Appl. No.: 13/431,554

(22) Filed: Mar. 27, 2012

(51) Int. Cl.
*B31D 1/02* (2006.01)
*B29C 65/00* (2006.01)
*B29L 31/00* (2006.01)

(52) U.S. Cl.
CPC ......... *B31D 1/021* (2013.01); *B29C 2793/0054* (2013.01); *B31D 1/026* (2013.01); *B29C 66/472* (2013.01); *B29L 2031/744* (2013.01)
USPC ........... 156/247; 156/248; 156/267; 156/299; 156/302

(58) Field of Classification Search
None
See application file for complete search history.

(56) References Cited

U.S. PATENT DOCUMENTS 7,846,520 B2 * 12/2010 Azakami et al. ............. 428/40.1
2005/0266197 A1 * 12/2005 Kiraly et al. ................. 428/40.1

* cited by examiner

*Primary Examiner* — Barbara J Musser
(74) *Attorney, Agent, or Firm* — G. Brian Pingel; David M. Breiner

(57) ABSTRACT

A method of transferring a plurality of metal foil labels from a metal foil strip onto a continuous film liner in spaced apart juxtapositions, the method comprising placing metal foil strips onto a continuous web to form an assembly of the strips and the web, feeding the foil strip assembly through a compression roller module, and then feeding the foil strip assembly to a rotary die cutting module to cut through said metal foil strip and portions of said web to form a plurality of metal foil labels.

12 Claims, 5 Drawing Sheets

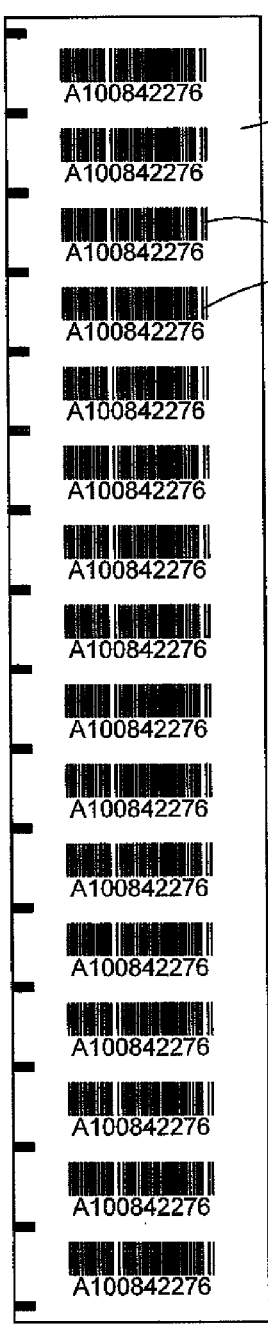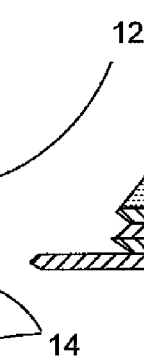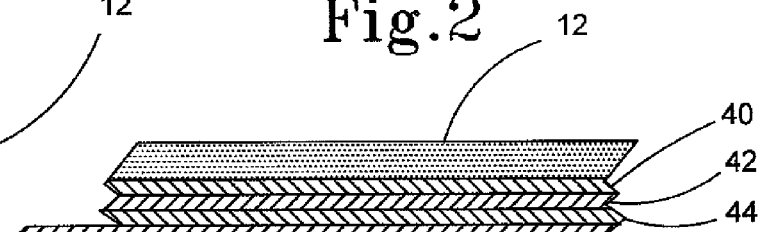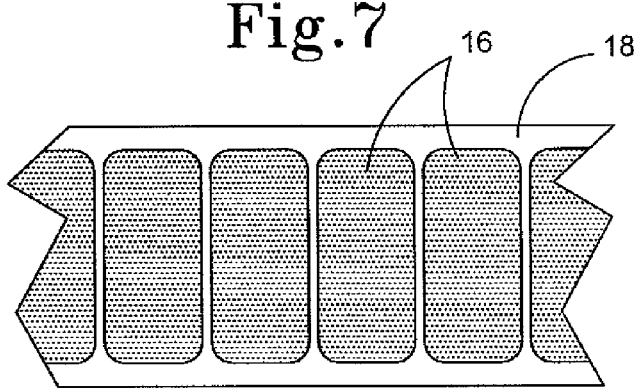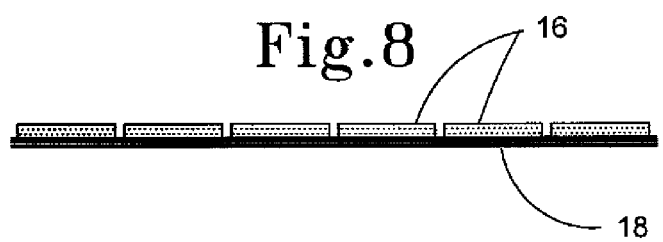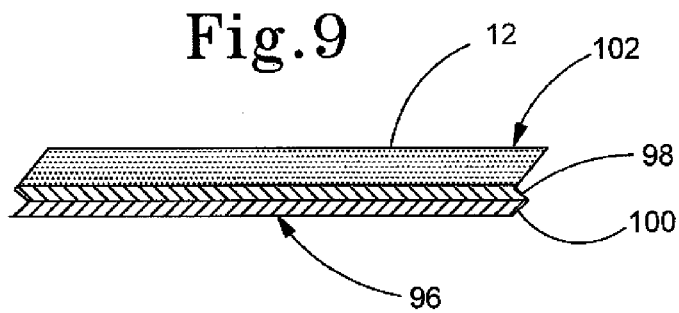

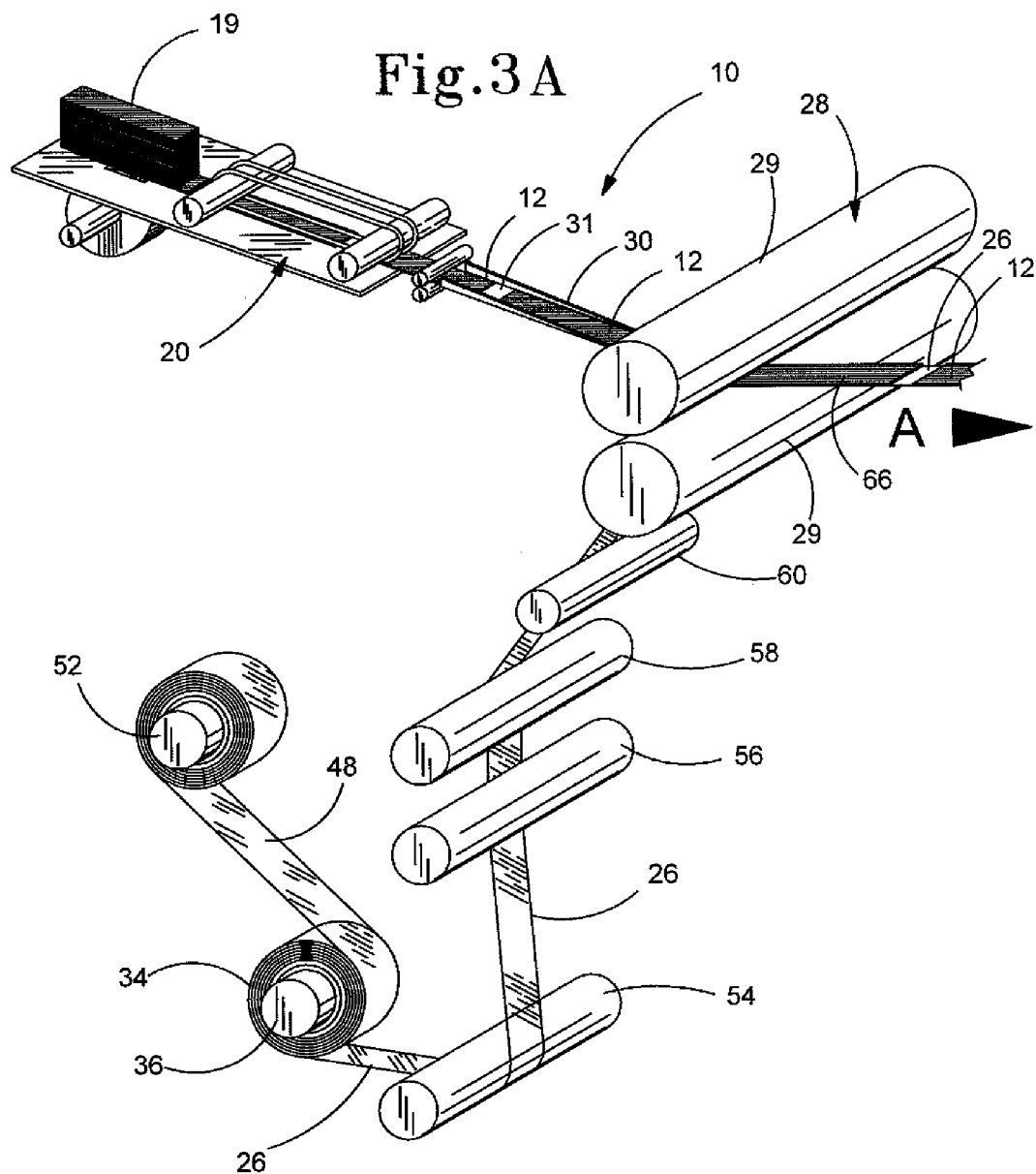

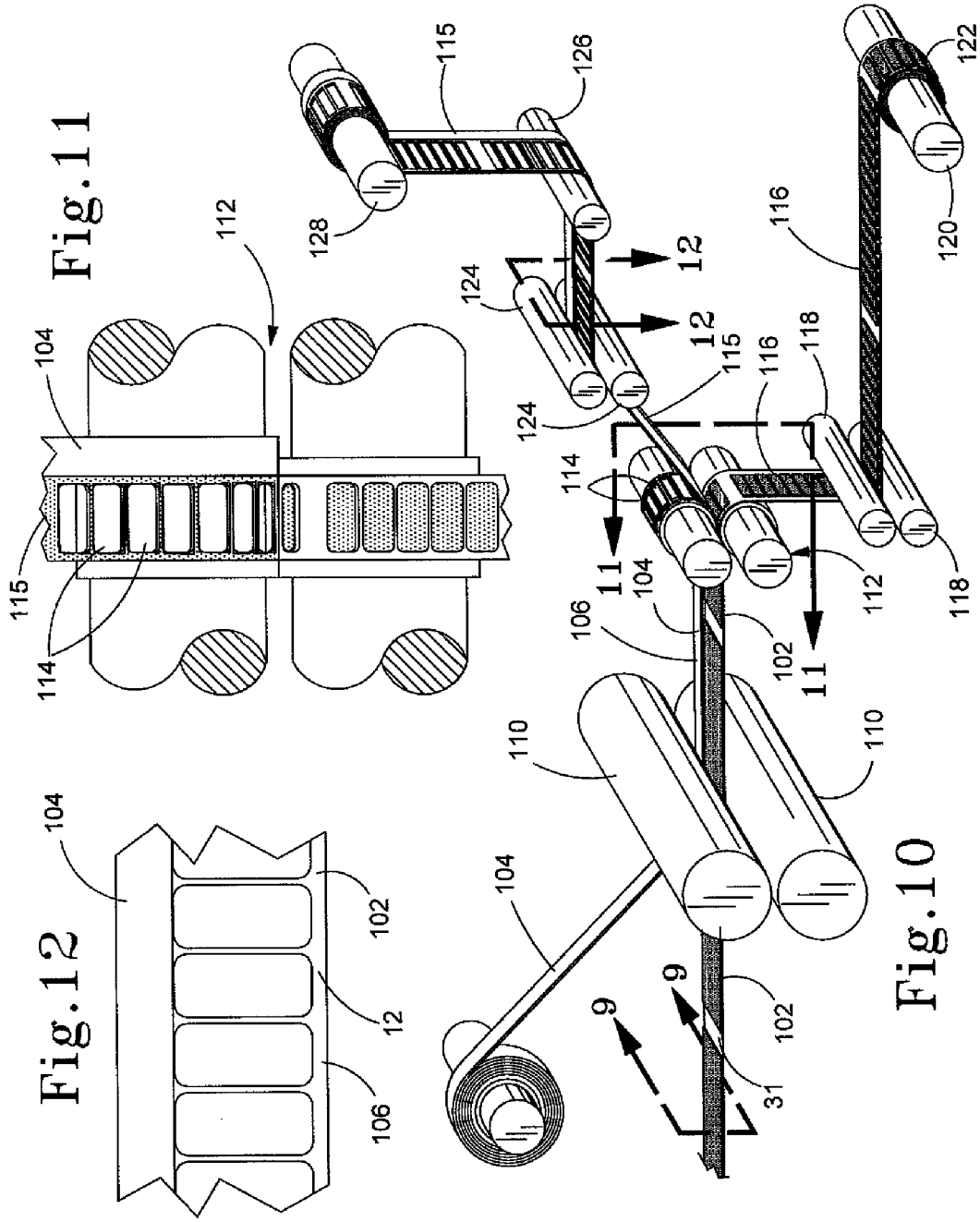

PROCESS FOR PRODUCING METAL FOIL LABELS IN ROLL FORM

BACKGROUND OF THE INVENTION

1. Field of the Invention

The present invention is related in general to the production of individual metal foil labels and more specifically to a method for producing such labels positioned on a continuous film in roll form.

2. Description of the Prior Art

Metal foil labels produced from anodized aluminum that conform to most surfaces yet have the ability to withstand harsh conditions including chemicals, abrasions, solvents and high temperatures have proven to be highly useful in a variety of applications. Such labels are produced using a photo imaging process for maximum clarity and detail and then sealing the image within an anodic layer of aluminum. Some of the uses of such labels are as foil bar code labels, bar code name plates and various types and sizes of printed multi-color logo plates. Although metal foil labels have the flexibility to be used for a variety of purposes, there has been no successful process known in the industry for forming the labels on a continuous layer of film line that can be wrapped into a roll with the foil labels positioned in a spaced apart relationship thereon, which is a highly advantageous construction for use with automated equipment.

The present invention provides an improvement in the manufacture and distribution of metal foil labels by several embodiments of the invention.

SUMMARY OF THE INVENTION

The present invention provides a method of transferring a plurality of metal foil labels from a metal foil strip onto a continuous film liner in spaced apart juxtapositions, which method comprises the steps of:

Placing, in consecutive order in a spaced apart relationship, a plurality of metal foil strips of said labels onto a top side of a continuous web formed of at least an adhesive material and a layer of film to form an assembly of said foil strips and said web;

Feeding said foil strip assembly through a compression roller module to secure the foil strips onto the web;

Feeding the foil strip assembly to a rotary die cutting module adapted to cut through the metal foil strips and the adhesive material layer of the assembly to form said plurality of metal foil labels; and Stripping the adhesive material and any scrap product of said foil strips surrounding said foil labels from said assembly to leave said labels residing on the liner. Although it is advantageous for some applications to include in the invention a continuous web formed of only an adhesive top layer and a bottom liner of film to form a thin web on which the metal foil strips are positioned, it is highly preferable to have the web formed of four layers comprising a single pressure sensitive adhesive layer on the top, a clear polymer film layer secured to the bottom of the top adhesive layer, a second single pressure sensitive adhesive layer secured to the bottom surface of the clear film layer and, lastly, a bottom layer formed of a second film liner.

BRIEF DESCRIPTION OF THE DRAWINGS

FIG. 1 is a top view of a standard metal foil strip on which bar code labels are imaged;

FIG. 2 is an enlarged cross-sectional view of a continuous web on which a metal foil strip as seen in FIG. 1 is positioned thereon as part of the process of the present invention;

FIG. 3*a* is a schematic view in perspective of a portion of an apparatus utilized in the practice of a first embodiment of this invention;

FIG. 7 is a top view of a plurality of individual metal foil labels positioned on a continuous web;

FIG. 8 is a side view of the view of FIG. 7;

FIG. 9 is an enlarged cross-sectional view of one of the metal foil labels of FIG. 7;

FIG. 10 is a schematic view in perspective of an apparatus utilized in the practice of a second embodiment of this invention;

FIG. 11 is a sectional view taken along the line 11-11 of FIG. 10; and FIG. 12 is a sectional view taken along the line 12-12 of FIG. 10.

DETAILED DESCRIPTION OF THE PREFERRED EMBODIMENTS

The present invention provides an efficient and relatively inexpensive method for transferring a plurality of metal foil labels from a metal foil strip onto a continuous film liner that can be rolled up for convenience of storage or transportation and for use with automated equipment. Two different embodiments of the invention are disclosed herein which may be used alternatively depending upon the type of finished metal foil labels desired.

Figure 3B:
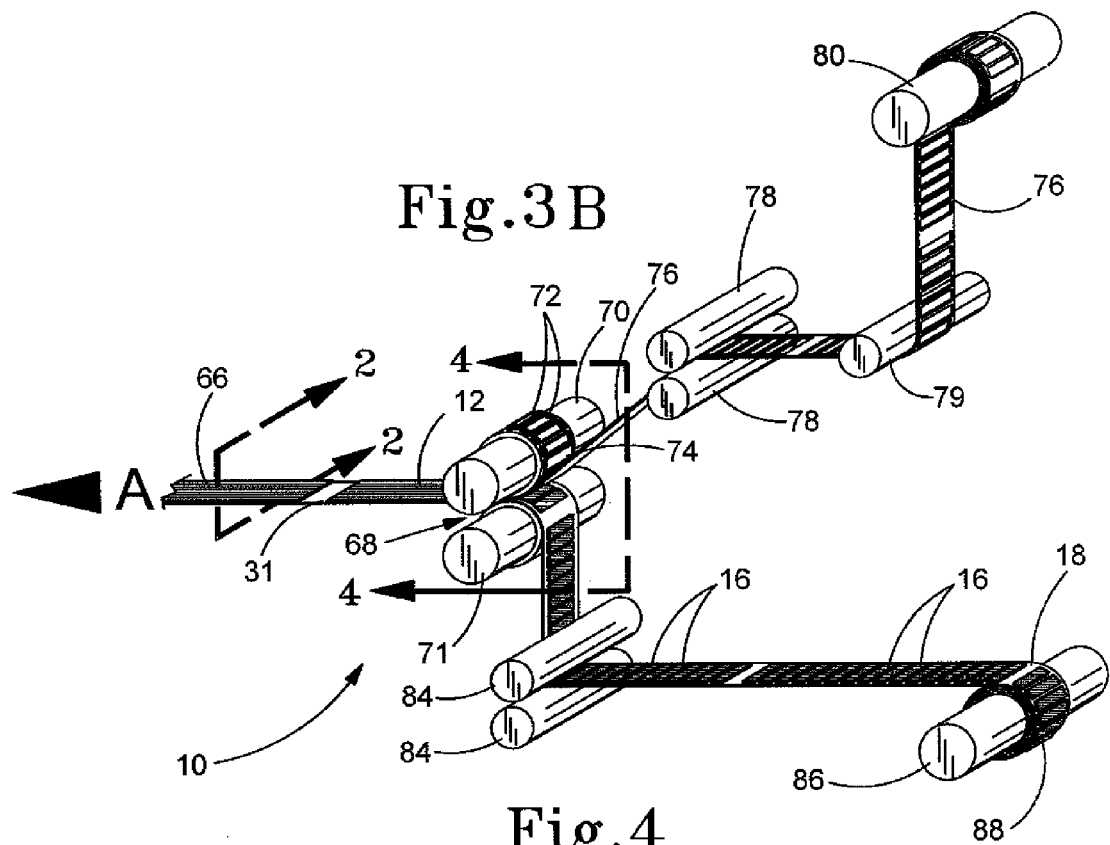
FIG. 3*b* is a schematic view in perspective of the remaining portion of the apparatus utilized in the practice of a first embodiment of this invention, which together with the apparatus of FIG. 3*a* completes the representation of a specific apparatus for carrying out the process of the invention.
Figure 4:
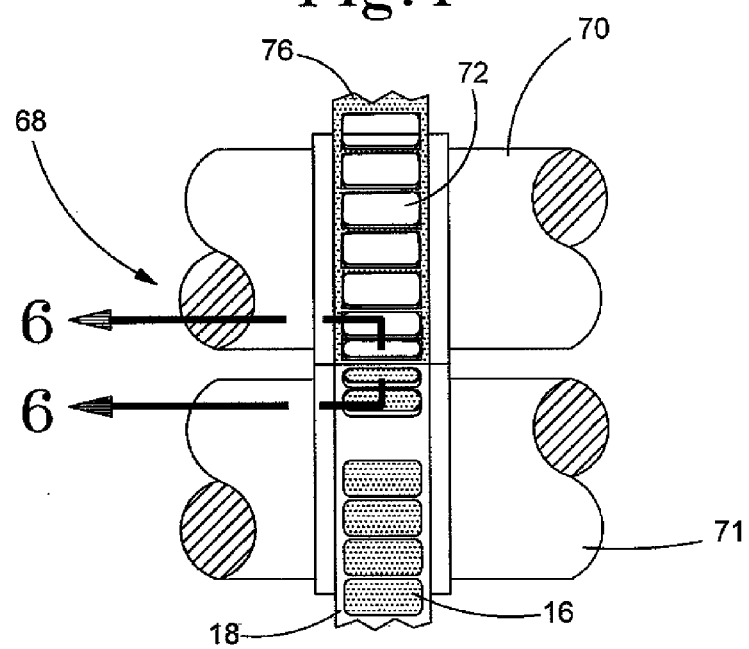
FIG. 4 is a sectional view taken along line 4-4 of FIG. 3*b*.
Figure 5:
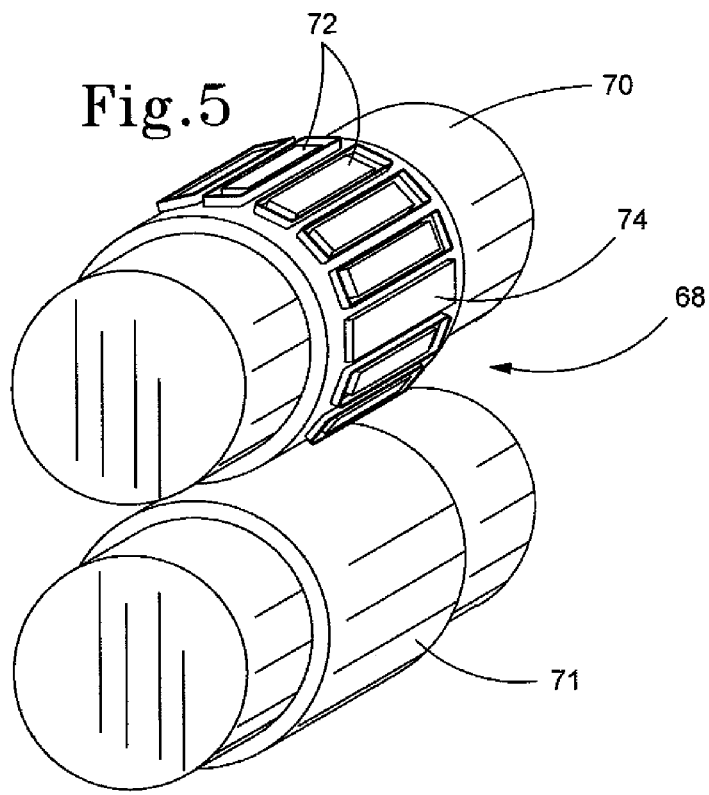
FIG. 5 is a perspective view of a die cutting module that is included in the apparatus of FIG. 3*b*.

Referring now to the drawings, FIGS. 3*a* and 3*b* together disclose an apparatus 10 utilized in the practice of a first preferred embodiment of the invention. The apparatus 10 is designed to be fed individual metal foil strips 12, each with a plurality of label images 14 formed thereon as shown in FIG. 1 and processing said strips in a manner to form individual labels 16 (see FIG. 3*b*) that are secured on a clear polymer film liner 18, as also shown in FIG. 3*b*.

Preferably, the metal strips 12 are prepared as a standard foil product in sheet form and the images 14 thereon are added to the sheets with a preferably photographic process that is well-known in the art. The process consists of exposing the sheets through a negative, then running them through a developer bath, then a fixer bath, and then rinsed and sealed. The exposed sheets are taken from the exposure process and then cut into the strips 12 of a length sufficient to accommodate 16 of the label images 14 as shown in FIG. 1. However, the number of images 14 is a matter of choice depending on the desired size of the strips 12. The strips 12 are then placed in a stack 19 and are fed to the apparatus 10 by means of preferably a feeder 20, such as a Longford International Ltd. C350/C700 Friction Feeder, shown schematically in FIG. 3*a*.

The feeder 20 pulls one strip 12 at a time from the bottom of the stack 19 of strips 12 and moves each strip 12 through the feeder 20 to be positioned onto the top surface of a passing web 26 as it enters a compression roller module 28 of the apparatus 10. The compression roller module includes two rollers 29 and preferably is a compression roller module of a web rotary converting system manufactured and sold by Delta Industrial under the trademark "THE DELTA MOD-TECH CRUSADER." As the strips 12 are fed to the rollers 29, the roller module 28 includes a chute 30 to help support the strips 12 so that they are placed in a proper position on the web 26, spaced approximately a one-quarter inch gap 31 from one another. The feeder 20 preferably includes a sensor (not shown) as is well-known in the art that controls the timing of the feeding of the strips 12 by the feeder 20 into contact with the web 26.

As can be seen in FIG. 3a, the web 26 is provided from a web spool 34 mounted on a feed roller 36. The web 26, as indicated in FIG. 2, is formed of a plurality of layers that in this first embodiment preferably comprise four layers, each approximately 0.002" thick, with a first pressure sensitive adhesive top layer 40, a thin polymer layer 42 (preferably polyester) adhered to the underside of the adhesive layer 40, a second pressure sensitive adhesive layer 44 adhered to the bottom surface of the layer 42 and the release liner 18 that serves as the bottom layer of the web 26. The adhesive layer 44 will serve as the adhesive that the end user will use for attachment of a label 16 once the release liner 18 is removed therefrom.

Referring again to FIG. 3a, as the web 26 is removed from the spool 34, a release liner 48 initially covering the adhesive layer 40 is removed from the web 26 and is wound on a take-up spool assembly 52. To maintain proper tension on the web 26 as it leaves the spool 34, the web 26 travels around a guide roller 54 that has a release coating to keep the adhesive top layer 40 of the web 26 from sticking to it. The web 26 then travels preferably past three additional guide 115 rollers 56, 58 and 60 before entering the compression roller module 28 and merging with the metal foil strips 12. The compression roller module 28 is adapted to apply a sufficient compressive force on the web 26 and the metal strips 12 to secure the strips 12 thereon, thus, forming an assembly 66 of said strips 12 and said web 26.

Referring now to FIG. 3b, the web and strip assembly 66 is fed to a rotary die cutting module 68 that includes a die cutting roller 70 and a support roller 71 having 16 cutting cavities 72 to match the number of images 14 on the strips 12 and one blank cavity 74 that matches the size of the gap 32 between the strips 12 plus a small amount of scrap from the leading and trailing edges of the strips 12. As is well known in the art, a sensor (not shown) is associated with the die cutting module 68 to insure that the assembly 66 is properly aligned with the cutting 125 cavities 72 so that each strip 12 will be cut into sixteen separate labels 16 as will now be described.

Figure 6:
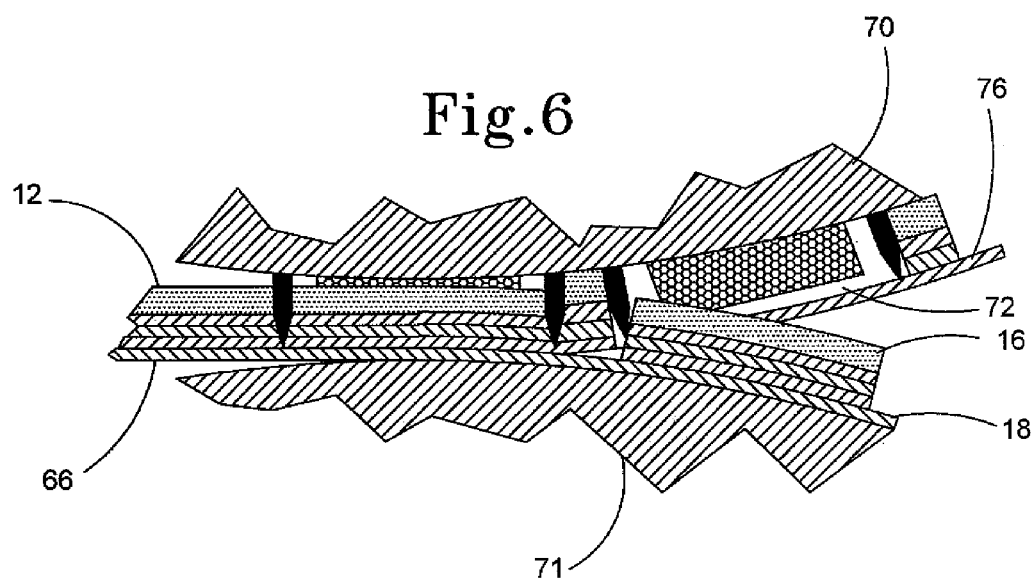
FIG. 6 is a cross-sectional view taken along the line 6-6 of FIG. 4.

As the web and strip assembly 66 passes through the die cutting module 68, the cutting cavities 72 are adapted to cut into the assembly 66 to cut through each strip 12 and the top three layers of the web 26 to form the individual labels 16, as indicated in FIGS. 6-8. As the action of the cutting module 68 is completed for each of the labels 16, scrap 76 consisting of the excess metal foil and the web layers surrounding the labels 16 is then removed from the assembly 66 and is directed through compressive rollers 78, a guide roller 79 to a take-up roller 80. Concurrently, the formed labels 16 as shown in FIGS. 7 and 8 that are now arranged on the bottom release liner 18 in a spaced apart relationship are directed through compressive rollers 84 to a take-up roller 86 to be collected in a spool 88 (See FIG. 3b).

Because of the roll format of the labels 16 on the continuous liner 18 that is provided by this invention, there are several distinct advantages, the most important of which is that such format helps customers using automated equipment to apply the rolled labels in their process, thus saving them time and money in added efficiency. Additionally, the roll format is advantageous for purposes of storage and transportation.

As indicated with respect to the description of the preferred embodiment above, preferably the web 26 is formed of four layers of material. However, in those instances in which it may be advantageous to make a label of thinner construction, it is possible to utilize a web construction formed of only two layers, as shown in FIG. 9 wherein a web 96 formed of a single pressure sensitive adhesive layer 98 and preferably a polymer film liner 100 in association with one of the metal strips 12 forms a web and strip assembly 102.

Utilization of the web 96 in the second embodiment of the present invention begins initially similar to process described above. However, after the web 96 is overlaid with metal strips 12 as described with respect to the first embodiment and passes through the compression roller module 28 to form the assembly 102, preferably a narrow band of tape 104 is applied to the edge of the assembly 102 as shown in FIG. 10 to form a taped assembly 106. As best indicated in FIG. 12 the tape 104 only overlies what will be the scrap portion of the assembly 102 and since it is off to the side of the assembly 102 in the scrap portion it does not end up in the final labels 16.

Once the tape 104 is applied to the assembly 102, the taped assembly 106 is then fed to compression rollers 110 to securely adhere the tape 104 and the assembly 102 together. The taped assembly 106 is fed to a die cutting module 112 similar to the die cutting module 68. However, because the web 96 is comprised of only two layers, the die cutting module 112 has die cutting cavities 114 adapted to only cut through the metal strips 12 and the adhesive layer 98 of the web 96.

After such cutting action by the module 112, scrap 115 from the metal strips 12, the adhesive layer 98 and the tape 104 are removed from the assembly 102 to leave finished labels 116 on the liner 100. Obviously, the labels 116 are of a thinner construction than those described with respect to the first preferred embodiment in that they only include the top aluminum portion, a middle adhesive portion and a liner bottom portion. The labels 116 are then moved through compressive rollers 118 to the take-up roller 120 to be wound into a roll 122. The scrap 115 is passed through compressive rollers 124, a guide roller 126 and to a roll 128.

Thus, as has been described above, the present invention provides a highly efficient process for forming labels on a continuous web that can be wrapped in roll form. Although the invention has been described with respect to two preferred embodiments, it should be understood that such embodiments may be altered without avoiding the true spirit and scope of the present invention. For example, the apparatus employed in the process of the present invention may be of a variety of forms so long as it accomplishes the disclosed steps of the processes of the embodiments.

What is claimed is:

1. A method of transferring a plurality of metal foil labels from a metal foil strip onto a continuous film liner in spaced apart checks to positions, said method comprising:
   (a) placing in consecutive order in a spaced apart relationship a plurality of strips consisting of metal foil onto a top side of a web formed of a first top layer of pressure sensitive adhesive, a second layer of polymer film adhered to the bottom side of said first layer of adhesive, a third layer of pressure sensitive adhesive adhered to the bottom side of said second layer and a fourth bottom liner of polymer film attached to the bottom surface of said third layer to form an assembly of said foil strips and said web;

(b) feeding said foil strip assembly through a compression roller module to secure said metal foil strips onto said web;

(c) feeding said foil strip assembly to a rotary die cutting module that is adapted to cut through said metal foil strip and the said first, second and third layers of said assembly to form said plurality of metal foil labels; and (d) stripping scrap product of said foil strips and said first, second and third layers of said assembly surrounding said foil labels from said assembly to leave said labels residing on said liner.

2. The method as described in claim 1 wherein said labels residing on said liner are collected in a roll.

3. The method as described in claim 2 wherein said scrap product is collected in a roll separate from said roll of labels.

4. The method as described in claim 3 wherein said metal foil strips are placed on said web approximately one quarter inch from one another.

5. A method of transferring a plurality of metal foil labels from a metal foil strip onto a continuous film liner in spaced apart juxtapositions, said method comprising:

(a) placing, in consecutive order in a spaced apart relationship, a plurality of strips consisting of metal foil onto a top side of a continuous web formed of a top layer of pressure sensitive adhesive and a bottom layer of polymer film to form an assembly of said foil strips and said web;

(b) applying a narrow layer of tape to one top edge margin of said web and foil strip assembly;

(c) feeding said foil strip assembly and tape to a cutting module that is adapted to cut through said metal foil strip and said adhesive layer of said assembly to form said plurality of metal foil labels; and (d) stripping said tape and scrap product of said foil strips and said adhesive layer surrounding said foil labels from said assembly to leave said labels residing on said liner.

6. The method as described in claim 5 wherein following the application of said tape layer to said web and foil strip assembly, said foil strip assembly and tape is passed through a compression roller module.

7. The method as described in claim 6 wherein said labels residing on said liner are collected in a roll.

8. A method of transferring a plurality of metal foil labels from a metal foil strip onto a continuous film liner in spaced apart juxtapositions, said method comprising:

(a) placing, in consecutive order in a spaced apart relationship, a plurality of strips consisting of metal foil onto a top side of a continuous web formed of at least a pressure sensitive adhesive layer and a layer of a release liner to form an assembly of said foil strips on said web;

(b) feeding said foil strip assembly through a compression roller module to secure said foil strips onto said web;

(c) feeding said foil strip assembly to a cutting module adapted to cut through said metal foil strip and said adhesive layer of said assembly to form said plurality of metal foil labels; and (d) stripping scrap product from said adhesive layer and said foil strips surrounding said foil labels from said assembly to leave said labels residing on said release liner.

9. The method as described in claim 8 wherein prior to feeding said foil strip assembly to said cutting module, a thin layer of tape is applied to an edge portion of said foil strip assembly so that said tape layer is not engaged by said cutting module during its cutting action.

10. The method as described in claim 9 wherein following the application of said tape to said foil strip assembly, the tape and foil strip assembly are fed through a compression roller module.

11. The method as described in claim 8 wherein said continuous web is formed of a first top layer of pressure sensitive adhesive, a second layer of film adhered to the bottom of said first layer of adhesive, a third layer of pressure sensitive adhesive adhered to the bottom side of said second layer and a fourth bottom liner of film attached to the bottom surface of said third layer.

12. The method as described in claim 8 wherein prior to feeding said foil strip assembly to said cutting module, a thin layer of tape is applied to an edge portion of said foil strip assembly, which tape layer is then removed from said strip assembly along with said scrap product.

* * * * *